(12) United States Patent
Guillemette et al.

(10) Patent No.: US 9,908,975 B2
(45) Date of Patent: Mar. 6, 2018

(54) MICROLAYER COEXTRUSION FOR COMPOUNDING, PELLETIZING, AND MASTERBATCHES

(71) Applicant: GUILL TOOL & ENGINEERING CO., INC., West Warwick, RI (US)

(72) Inventors: Richard Guillemette, West Warwick, RI (US); Robert Peters, West Warwick, RI (US)

(73) Assignee: Guill Tool & Engineering, Co., Inc, West Warwick, RI (US)

( * ) Notice: Subject to any disclaimer, the term of this patent is extended or adjusted under 35 U.S.C. 154(b) by 213 days.

(21) Appl. No.: 14/869,189

(22) Filed: Sep. 29, 2015

(65) Prior Publication Data

US 2017/0088676 A1 Mar. 30, 2017
US 2017/0190845 A9 Jul. 6, 2017

Related U.S. Application Data

(60) Provisional application No. 62/057,154, filed on Sep. 29, 2014.

(51) Int. Cl.
| | |
|---|---|
| *C08J 3/00* | (2006.01) |
| *B29C 47/06* | (2006.01) |
| *B29C 47/12* | (2006.01) |
| *B29C 47/38* | (2006.01) |
| *B29C 47/00* | (2006.01) |
| *B29K 101/10* | (2006.01) |

(52) U.S. Cl.
CPC ............ *C08J 3/005* (2013.01); *B29C 47/0009* (2013.01); *B29C 47/065* (2013.01); *B29C 47/128* (2013.01); *B29C 47/38* (2013.01); *B29K 2101/10* (2013.01); *C08J 2300/00* (2013.01)

(58) Field of Classification Search
CPC . B29C 47/38; B29C 47/0011; B29C 47/0014; B29C 47/0066; B29C 47/065; B29C 47/128; B29C 47/30; B29C 47/0009; B29B 9/06; B29K 2101/10; B29L 2031/772
USPC .......................................................... 428/402
See application file for complete search history.

(56) References Cited

U.S. PATENT DOCUMENTS

| | | | | |
|---|---|---|---|---|
| 6,533,565 | B1 * | 3/2003 | Guillemette | .......... B29C 47/705 425/113 |
| 6,669,458 | B2 * | 12/2003 | Guillemette | ........ B29C 47/0023 425/107 |
| 6,945,764 | B2 * | 9/2005 | Guillemette | .......... B29C 47/705 425/113 |
| 7,690,908 | B2 * | 4/2010 | Guillemette | .......... B29C 47/061 264/171.1 |
| 9,643,368 | B2 * | 5/2017 | Guillemette | ..... B29D 11/00663 |
| 9,656,437 | B2 * | 5/2017 | Guillemette | .............. B32B 1/08 |
| 2012/0018789 | A1 * | 1/2012 | Juengling | ......... H01L 27/10826 257/306 |
| 2015/0158233 | A1 * | 6/2015 | Guillemette | ............ B29C 47/26 428/36.91 |

* cited by examiner

*Primary Examiner* — Leszek Kiliman
(74) *Attorney, Agent, or Firm* — Ziegler IP Law Group, LLC

(57) ABSTRACT

The present disclosure generally relates to pelletizing and compounding extrusion die systems. In particular, the present disclosure relates to the cyclical extrusion of materials to generate small sized grain features, generally in the range of micro and nanosized grain features.

17 Claims, 5 Drawing Sheets

Figures 1a and 1b: Examples of Flat Microlayer Geometries:
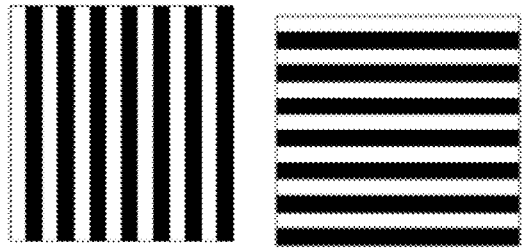
Figure 1a          Figure 1b
Figures 1c and 1d: Examples of Tubular Polygonal Microlayer Geometries:
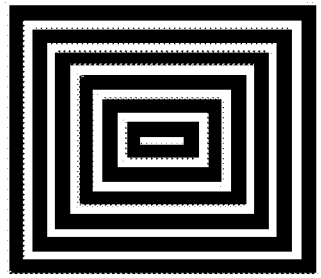 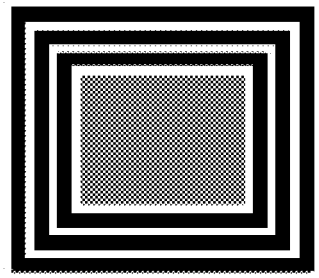
Figure 1c          Figure 1d
Figures 1e and 1f: Examples of Tubular Annular Microlayer Geometries:
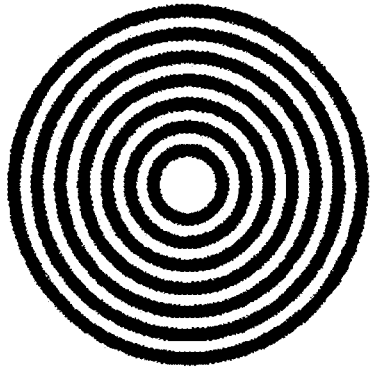 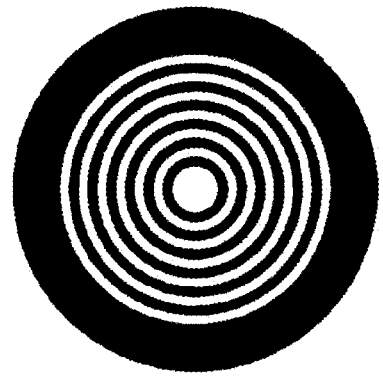
Figure 1e          Figure 1f Figures 1g and 1h: Examples of Multi Component Microlayer Geometries:
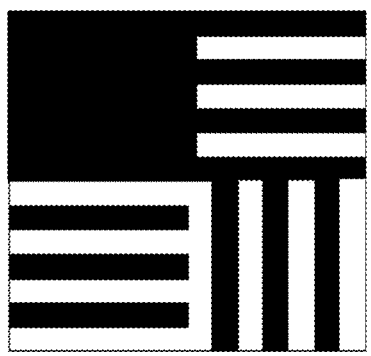 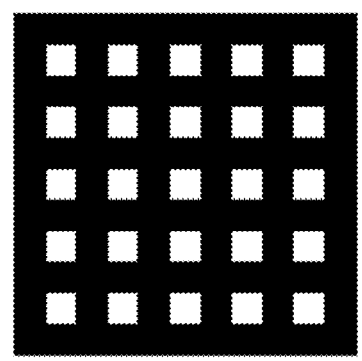
Figure 1g
Figure 1h
Figures 1i and 1j: Examples of Multi Component Microlayer Geometries:
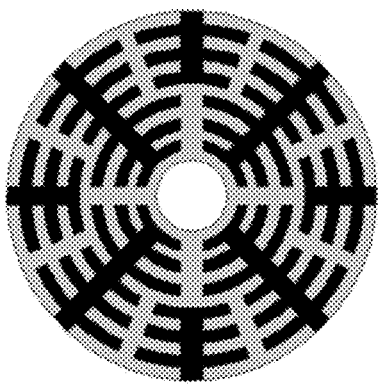 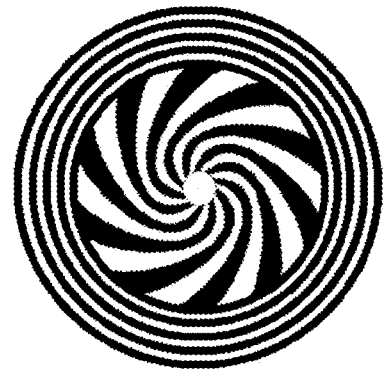
Figure 1i
Figure 1j

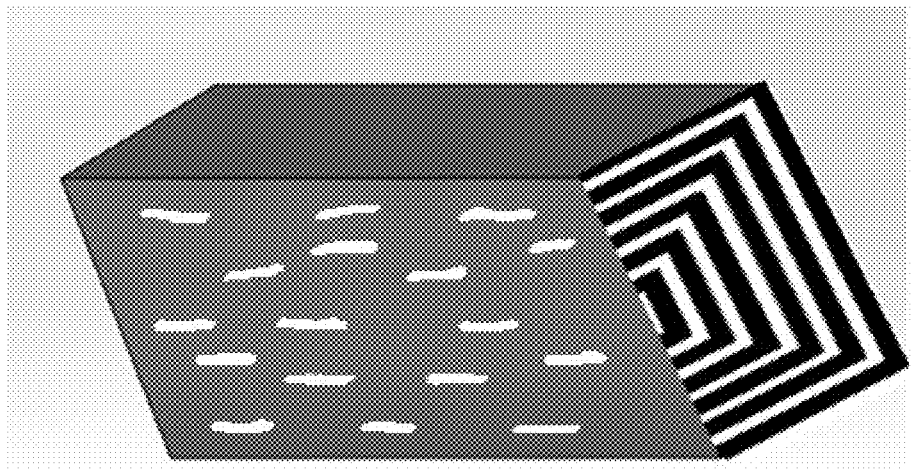
Figure 2. Orientation with layers
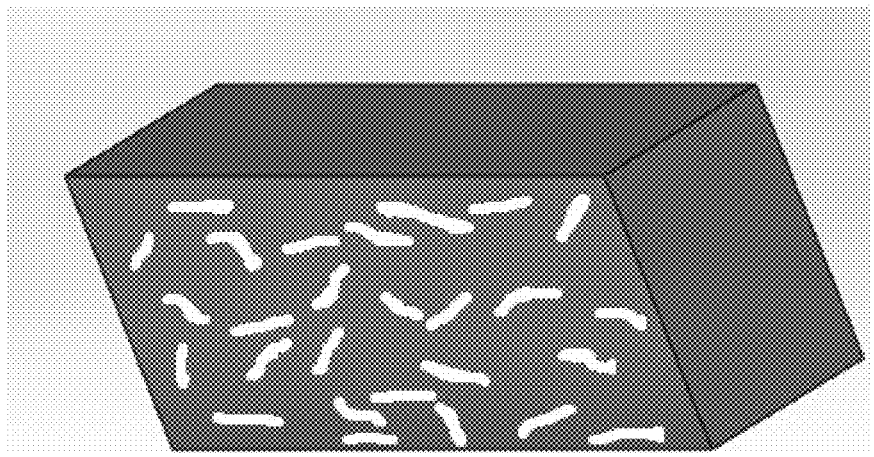
Figure 3: Less orientation without layers

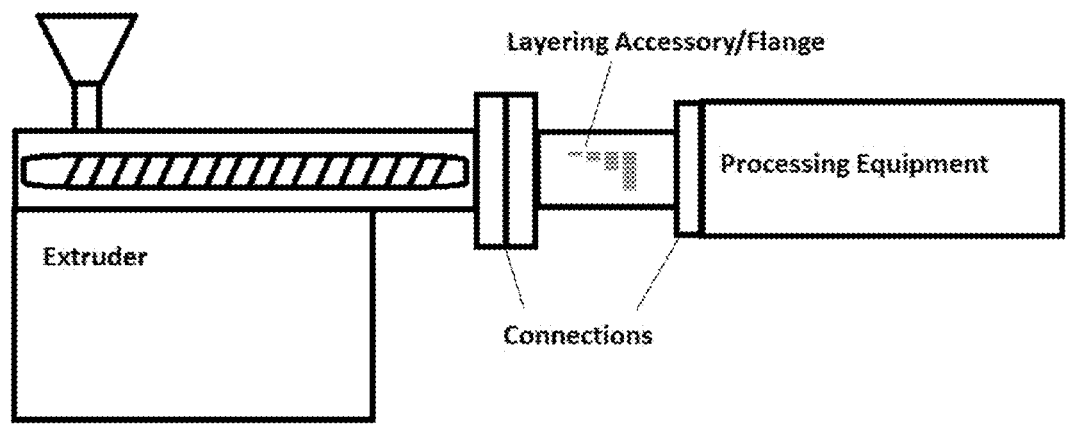
Figure 6: An extruder with an attached layering device
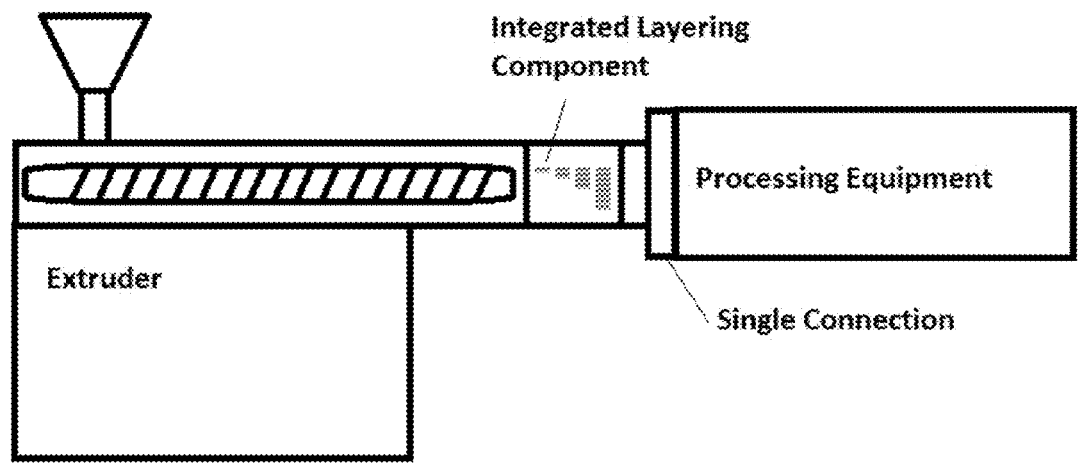
Figure 7: An extruder with an integrated layering device

MICROLAYER COEXTRUSION FOR COMPOUNDING, PELLETIZING, AND MASTERBATCHES

FIELD

The present disclosure generally relates to pelletizing and compounding extrusion die systems. In particular, the present disclosure relates to the cyclical extrusion of materials to generate small sized grain features, generally in the range of micro and nanosized grain features.

BACKGROUND

Compounding is the process of mixing multiple components including polymers, colorants, additives and fillers. This is often done in an extruder, such as a twin screw extruder. Pelletizing is the process of chopping extruded material into small pellets for use in a later process. A masterbatch is a compounded batch of pellets which contains a high concentration of an additive or filler in a polymer. Pellets from a masterbatch would be re-compounded along with unfilled pellets to create a desired concentration of additive or filler.

Many manufacturing processes involving plastics incorporate the use of pellets. Pellets are typically fed into an extruder where they are melted and pressurized for subsequent processes. These manufacturing processes include extrusion, injection molding, and blow molding. Pellets can also be used in recycling processes. In recycling processes, the degree of crystallinity of the polymer may be important such as in recycling PET (Polyethylene terephthalate) plastic.

Nanostructured materials are generally regarded as materials having very small grain feature size, typically in the range of approximately 1-100 nanometers ($10^{-9}$ meters). Metals, ceramics, polymeric and composite materials may be processed in a variety of ways to form nanosized features. These materials have the potential for wide ranging applications, including for example, industrial, biomedical, 3D printing and electronic applications. As a result, a great deal of study is ongoing to gain a better understanding of the characteristics of these materials.

Conventional extrusion formed products are limited to approximately twelve layers. Micro-layer extrusion processes can extend these limitations. Micro-layer extrusion processes that provide methods for obtaining small grain features is described in U.S. Pat. No. 7,690,908, (hereinafter the "908 patent") and U.S. Patent Publication 2012/0189789 (hereinafter the "789 Publication") both of which are commonly owned by the assignee of the instant application, the disclosures of which are incorporated herein by reference in their entirety. Further examples of extrusion technology are described in U.S. Pat. Nos. 6,669,458, 6,533,565 and 6,945,764, also commonly owned by the assignee of the instant application and the disclosures of which are incorporated herein by reference in their entirety.

SUMMARY

The aspects of the disclosed embodiments is directed to the compounding and pelletizing of extruded or coextruded multilayer materials. These materials contain tens to thousands of layers of micro- to nano-polymer layers. These new shapes contain contiguous layers of milli- to nano-polymer layers in three dimensions and these contiguous layers may be twisted or turned to further expand the potential microlayer geometries. These layers can take the form of flat layers, annular or tubular rings as well as multi component structures.

One embodiment relates to a pellet composition comprising:
a. a solid object of 0.1 mm-1 cm on one axis by 0.1 mm-2 cm on a second axis;
b. ten to 106 layers per millimeter along at least one axis; and
c. wherein each layer is 0.1 nanometer to 9 millimeter in width.

Suitable geometries for pellets include any shape such as cylindrical, spherical, capsular, conical, conical frustum, cubular, hemispherical, pyramidal, rectangular prismatic, tubular. Other examples of flat layer geometries are presented in FIGS. 1*a-b* and are depicted with a limited number of layers for illustrative purposes. Examples of Tubular Polygonal and Annular geometries are presented in FIGS. 1*c-f*. Examples of multicomponent geometries are presented in FIGS. 1*g-h*.

Microlayer coextrusion can be used to create products possessing tens to thousands of layers, such as fifty to one hundred layers or one to ten thousand layers or one hundred thousand layers. The layers may contain the same or different polymer and contain different fillers, particles or chemicals.

Another embodiment relates to a pellet wherein at least one layer is 0.1-100 nanometer on one axis. Pellets are three dimensional products and as such can be assigned three axes. For purposes of the present discussion, the primary axis is defined such that the layers run longitudinally along it. Thus, a pellet according to the present invention may comprise at least ten layers which are each 0.1-100 nanometer on this primary axis. In another embodiment of the invention, a pellet may comprise at least one hundred layers each of which are 0.1-100 nanometers on one axis. In another embodiment, a pellet may comprise at least one thousand layers which are 0.1-100 nanometer on one axis.

In another embodiment, a pellet may comprise at least one layer which is 0.01-1 micrometer on one axis. In another embodiment of the invention, a pellet may comprise at least one layer which is 0.01-1 millimeter on one axis.

In another embodiment, a pellet has a melting point of between 0° C. to about 500° C. Another embodiment relates to those pellets melting near or below room temperature (0° C. to about 30° C.). Another embodiment relates to those pellets melting at relatively low temperatures such as 30° C. to about 150° C. Another embodiment relates to those pellets melting at temperatures from about 150° C. to about 250° C. Another embodiment relates to those pellets melting at relatively high temperatures such as metals, such as from about 300° C. to about 500° C.

An example with two compositions of the layers could contain composition A and composition B and the layers could alternate A-B-A-B-A-B. or even A-B-B-A-B-B-A-B-B. Three component compositions containing compositions A, B and C may likewise form alternating layers such as A-B-C-A-B-C-A-B-C. Such microlayer extrusions can form their own products or can be applied onto a core.

Another embodiment relates to products containing a composite inner core extruded with composite milli, micro, or nano layers on the exterior.

Another embodiment relates to products containing multiple layers of varying components.

Microlayer coextrusion can be used to blend different materials into a homogenous mixture. As used herein, homogeneous means that the components are spread out randomly within the mixture. If a line were to be drawn through the axis of the stream mixture, all components would be statistically randomly positioned along the line. This is so because at the layer thickness of the invention molecular size or particle size kinetics influence distribution. Another way of understanding homogeneity is to appreciate that if layer sizes are brought sufficiently into the nanometer range, the layer sizes are so small that the resultant material is more of a blend of the layer materials rather than a layered structure. This process could be used on its own to create a blend from separate materials or could be used as a secondary process to further ensure a homogenous blend. The blended materials could be extruded and pelletized for later use or they can be directly fed into a subsequent process for immediate use.

Another embodiment relates to an extruder accessory device which could perform the microlayering or multicomponent process to form a stream of molten material comprising of multilayers of milli, micro or nanometer thickness from the output of one or more extruders prior to subsequent processing of the melt stream. This device could take the place of a flange which would ordinarily connect an extruder to downstream equipment. An example can be seen in FIG. 6. An extruder could have such a device integrated as a component following pressurization by the extruder's one or more screws. The device could also be integrated as a flange which would connect to one or more extruders on one end and further processing devices on the other. An example schematic of an extruder with integrated layering can be seen in FIG. 7. These aforementioned processing devices could include but are not limited to extrusion dies, molds, and blow molding dies.

Microlayer coextrusion also allows for enhanced alignment of filler particles or fibers along the direction of the extrusion. Filler particles are mostly restrained within each layer and as they approach a magnitude of size similar to the fiber or particle size, shear stresses and confinement by layer boundaries act to align particles in the direction of the extrusion. In a particle with three characteristic dimensions, the smallest dimension will be perpendicular to the layer boundary and the longest dimension will be in the direction of the extrusion. Platelet or flake-like fillers will align in a two dimensional manner while confined by the layers surrounding them.

Another embodiment relates to products containing filler particles or fibers. More preferred products contain filler particles or fibers aligned along the extrusion axis.

The creation of many layers as well as the shear stresses resulting from the repeated spreading and thinning of individual layers of materials can also help to enhance the dispersion of fillers. The enhanced dispersion may help to prevent aggregates or agglomerates of the filler and the shear stresses may aid in the deterioration of agglomerates.

There are many material properties that can be tailored or modified by filled and unfilled microlayer coextrusion. These include coloring, mechanical properties, optical properties, barrier properties, conductivity, crystallinity, as well as time scales of melting and dissolving.

Coloring active ingredients include quinacridones, phthalocyanines azo-type dyes, nickel titanate, titanium dioxide, cobalt, and manganese chrome antimony titanate, said active ingredient in a concentration of at least 60% by weight.

In another embodiment of the invention, at least one layer contains a colorant.

In another embodiment of the invention, the pellet comprises two compositions wherein one composition comprises hydrophobic agents and the second composition comprises hydrophilic agents.

In another embodiment of the invention, the pellet comprises two compositions wherein one composition comprises acidic agents and the second composition comprises basic agents.

In another embodiment of the invention, the pellet comprises two compositions wherein one composition comprises a lower density composition and the second composition comprises a higher density composition.

In another embodiment of the invention, the pellet comprises two compositions wherein one composition comprises a highly viscous composition and the second composition comprises a non-viscous composition. Viscosity is measured in centipoise (cP) and liquids such as glycerin and oils are known as high viscosity materials. Liquids such as water, alcohols, and low molecular weight hydrocarbons are known as low viscosity materials.

In another embodiment of the invention, the pellet comprises two compositions wherein one composition comprises a material processed at one temperature range and the second composition processes at a higher temperature range.

Another embodiment involves a method of creating fillers within a pellet by coextruding a first lower temperature material along with either a higher melt temperature material or a thermoset material such that in subsequent processing, the second material resists melting and retains its shape.

In another embodiment, the pellet comprises two compositions wherein one composition comprises a high concentration of one or more agents and the second composition comprises a low concentration of one or more agents or no agent at all.

Fillers also refers to flakes such as copper or tin flakes.

Fibers include single fibers or a myriad of other arrangements. Some exemplary arrangements include yarns, a tow of fibers or yarns, a weave, a non-woven, chopped fiber, a chopped fiber mat (with random or ordered formats), or combinations of these formats. The chopped fiber mat or nonwoven may be stretched, stressed, or oriented to provide some alignment of the fibers within the nonwoven or chopped fiber mat, rather than having a random arrangement of fibers.

Fibers also generally possess an average aspect ratio of 10-3000 and more commonly are fibers having an average aspect ratio of 20-1000. Aspect ratios of 20-350 and 50-200 are specifically envisioned. Various types of organic and inorganic fibers are suitable either in monofilament or stranded form (including bundles of fibers bonded together to make a single element which serves as a single fiber in the sense of orientation and reinforcement).

Filler particles or fibers include graphene, wood fibers (including groundwood, thermomechanical pulp (TMP) and bleached or unbleached kraft or sulfite pulps), vegetable fibers (including cellulose, lignin, cotton, hemp, jute, flax, ramie, sisal and bagasse), animal fibers (including proteinaceous strands such as silkworm silk, spider silk, sinew, catgut, wool, sea silk and hair such as cashmere wool, mohair and angora, fur such as sheepskin, rabbit, mink, fox, or beaver), other synthetic polymeric fibers (including rayon, modal, Lyocell polyamide nylon, PET or PBT polyester, phenol-formaldehyde (PF), polyvinyl alcohol fiber (PVA) vinylon, polyvinyl chloride fiber (PVC) vinyon, polyolefins (PP and PE) olefin fiber, acrylic polyesters, pure polyester, aromatic polyamids (aramids) such as Twaron, Kevlar and Nomex, polyethylene (PE), HMPE (e.g.

Dyneema or Spectra), polyurethane fiber, and elastomers including spandex), metallic fibers such as those drawn from ductile metals such as copper, gold or silver and extruded or deposited from more brittle ones, such as nickel, aluminum or iron, stainless steel fibers, silicon carbide fibers, clay particles, carbon fibers or glass fibers.

Particularly important fibers include the so-called micro and nano fibers including nanocellulous fibers and synthetic nanotubules including carbon nanotubes, inorganic nanotubes and DNA nanotubes.

Fibers also includes microfibers known as sub-denier fibers (such as polyester drawn to 0.5 dn). Denier and Detex fibers include fibers categorized by weight and length measurements. Fiber designs also includes fibers split into multiple finer fibers. Most synthetic fibers are round in cross-section, but special designs can be hollow, oval, star-shaped or trilobal. The latter design provides more optically reflective properties. Synthetic fibers may also be crimped to provide a woven, non woven or knitted structure. Fiber surfaces can also be dull or bright. Dull surfaces reflect more light while bright tends to transmit light and make the fiber more transparent.

Very short and/or irregular fibers have been called fibrils. Natural cellulose, such as cotton or bleached kraft, show smaller fibrils jutting out and away from the main fiber structure.

Fibers alignment can also be tailored by the application of external forces such as magnetic fields.

Another embodiment of the pellet composition of the present disclosure comprises additives such as ultraviolet light absorbers, light stabilizers, antioxidants, flame-retardants, antibacterial agents, surface tension reducers, deodorizing agents, anti-static agents, anti-blocking agents, plasticizer agents, blowing agents, fillers, and other known additives, or mixtures thereof.

Another embodiment relates to a method of blending multiple streams and directly feeding the stream into a subsequent process for immediate use.

These and other aspects and advantages of the exemplary embodiments will become apparent from the following detailed description considered in conjunction with the accompanying drawings. It is to be understood, however, that the drawings are designed solely for purposes of illustration and not as a definition of the limits of the invention, for which reference should be made to the appended claims. Additional aspects and advantages of the invention will be set forth in the description that follows, and in part will be obvious from the description, or may be learned by practice of the invention. Moreover, the aspects and advantages of the invention may be realized and obtained by means of the instrumentalities and combinations particularly pointed out in the appended claims.

BRIEF DESCRIPTION OF THE DRAWINGS

The accompanying drawings and Figures illustrate presently preferred embodiments of the present disclosure, and together with the general description given above and the detailed description given below, serve to explain the principles of the present disclosure. As shown throughout the drawings, like reference numerals designate like or corresponding parts.

FIGS. 1a-1b depict examples of flat layer geometries with a limited number of layers for illustrative purposes.

FIGS. 1c-1f depict examples of tubular, polygonal and annular geometries.

FIGS. 1g-1j depict examples of multicomponent geometries.

FIG. 2 illustrates the tendency of fibers to align along the axis of extruded layers.

FIG. 3 illustrates larger extrusion layers, no-layers or coated materials containing fibers that have fiber orientations that are more random or less ordered.

FIG. 6 depicts an extruder with an attached layering device.

FIG. 7 depicts an example schematic of an extruder with integrated layering.

DETAILED DESCRIPTION

Figure 4:
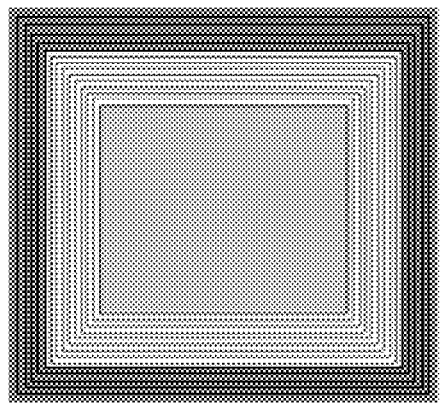
FIG. 4 illustrates a pellet with varying component sections which promotes better control of when and how fillers are dispersed.

The present disclosure is generally directed towards cyclical extrusion of materials to generate small sized grain features, generally in the range of micro and nanosized grain features. As will be understood, the various diagrams, flow charts and scenarios described herein are only examples, and there are many other scenarios to which the present disclosure will apply.

Rotating small, micro and nano-layer extrusion processes are described in U.S. Pat. Nos. 7,690,908 and 6,669,458. Small, micro and nano layer Non-rotating extrusion processes are described in U.S. Patent Publication 2012/0189789. U.S. patent application Ser. No. 14/084,601 filed Nov. 19, 2013, entitled "Method Of Creating Multilayered Products Through The Folding Of Continuous Layers" refers to other extrusion processes. Each of the aforesaid patent, publication and application are herein incorporated by reference in their entirety. Altering the die plate orientation around the central extrusion axis allows for the preparation of new geometric extrusion products described in further detail herein. Polygonal and annular geometries are described above. Folding methods are also included geometries. All of these geometries may be composed of milli, micro and nano layer streams or extrusions that can also include fillers and fibers. Independent of fibers, the layers may comprise different polymers or soluble components that do not mix. When these streams contain fillers or fibers and are extruded in the small, milli, micro, or nano layers the fibers tend to align along extruded layers such as depicted in FIG. 2. The relative sizes of fillers to sizes of layers will affect the degree of orientation.

Larger extrusion layers, no-layers or coated materials containing fibers have fiber orientations that are more random or less ordered, such as depicted in FIG. 3.

Orientation of fibers and flakes can change, enhance or create many properties of an extruded composite. This is important in the creation of composite materials. Extrusion in general has an orienting effect on fibers, however the inclusion of microlayers will amplify the degree of orientation. If the fiber has stronger mechanical properties than the matrix polymer, the product will be stronger in the direction of the fibers. Platelet or flake-like fillers will provide two-dimensional reinforcement. The benefits of the fiber orientation may be lost if the product is pelletized and then reprocessed. However, if the microlayer compounding process feeds directly into the subsequent process, the process may retain the enhanced alignment.

Microlayered composites can enhance conductivity by aligning conductive fillers and promoting conductive networks. This could be beneficial in applications such as EMI shielding.

Microlayers can also help promote and alter the nature of crystallinity of materials. When a layer of material is confined by another and the layer size approaches the size of a polymer molecule, certain polymer molecules will orient and crystallize when the layers cool or are annealed at a certain temperature. The nature of the crystallinity will shift from spherulite crystallinity to creating lamellae which will orient in plane with its layer as the layer size shrinks. Crystallinity in polymers can affect many material characteristics including mechanical properties, breathability and barrier properties. The nature and alignment of crystallinity will have different effects. The benefits of layers on crystallinity may be lost if the product is pelletized and then reprocessed, however, the desired or enhanced crystallinity may form as the product cools or is annealed if the microlayer compounding process feeds directly into the subsequent process. Crystallized pellets may be more suitable for handling and processing. This may be particularly useful in recycling processes.

Figure 5:
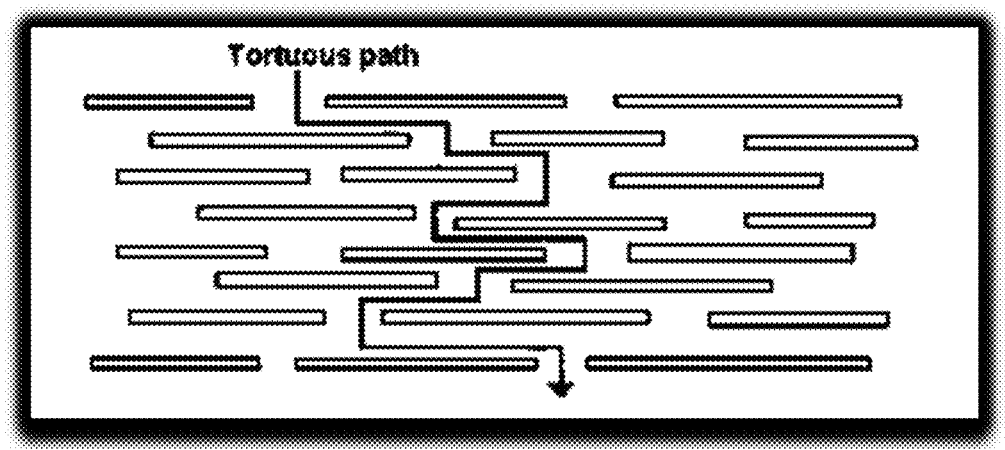
FIG. 5 illustrates a tortuous path a permeate would encounter due to lamellae crystals or high aspect ratio fillers.

Lamellae crystallinity as well as two dimensional confinement of platelet like fillers such as clay particles can help to improve or tailor barrier properties. An image of a tortuous path a permeate would encounter due to lamellae crystals or high aspect ratio fillers is shown in FIG. 5.

The creation of many layers as well as the shear stresses resulting from the repeated spreading and thinning of individual layers of materials can also help to enhance the dispersion of fillers. The enhanced dispersion may help to prevent agglomerates of the filler and the shear stresses may aid in the deterioration of agglomerates. Three important example fillers in which the reduction of agglomerates would be particularly beneficial include clay particles, nanocellulose fibers and graphene.

The use of microlayers to enhance fillers and reduce agglomeration could have a positive impact on the effectiveness of masterbatches produced. Masterbatches can sometimes be created in multiple steps in which the concentration of filler or additive is changed in each step. The use of masterbatches can often increase the dispersion of a filler compared to a single step where the filler and polymer are mixed immediately to the desired concentration. However, with microlayer coextrusion it may be possible to achieve the desired dispersion without a masterbatch. This is important because polymers degrade after repeated processing.

The effects of layering may also help to reduce or minimize the presence of large gels. Gels are usually considered defects and contain material which is not fully melted. Microlayering may help to disperse gels and prevent large agglomerates which may otherwise become a defect in an end product.

Microlayering can also help control the way a pellet will melt and disperse. If sections of a pellet are layered with higher molecular weight polymer or higher viscosity polymer, this section of the polymer could melt slower and result in a better dispersion of fillers in this section. Pellets with section of varying components such as FIG. 4 could be used to gain better control of when and how fillers are dispersed. Using multicomponent techniques, one could envision a pellets-within-a-pellet system where sections of slower melting materials are released from a matrix of quicker melting materials. FIG. 1h could represent a pellet which does this.

Similarly, a pellet could be envisioned in which certain layers or components of it are comprised of one or more higher melt temperature plastics or materials such as a metal. This higher melt temperature material could have a temperature processing range which is just in or out of the processing range for other materials going into the pellet. This may allow for the creation of features in the pellet which would resist melting when the pellet is processed in its end application at a lower temperature, in essence becoming a filler itself. This could allow for these high temperature features to be released as the pellet melts at lower temperatures and flow within any molten polymer stream. The high temperature plastics could be filled and or mixed with other plastics which could create a porous feature or other effects depending on the other material. The high temperature features could be created by a multicomponent approach or could be present in certain layers of a pellet made of concentric rings. With the multicomponent approach, features could be designed to interact with one another with features that may resemble hooks or the features may be formed into specific shapes such that they will orient in a certain manner during processing. Concentric rings of these high temperature plastics could result in a filler that is telescopic in nature with the features potentially only partially sliding past each other. If a pellet is tapered or shaped as it is cut/formed this may provide a barrier for the extent that one layer or feature could slide relative to another. These features if filled or made of special materials such as a metal could allow the end product to have enhanced properties such as strength, conductivity, EMI shielding, ductility, burst strength, and optics. Thermoset plastics could also be used instead of higher melt temperature plastics as they will not melt in subsequent processing.

The microlayering process may allow or enhance reactions from materials in different layers. As layers get thinner and more numerous, there is an increase in surface area between different materials. This increase in surface area may allow a reaction between different materials to occur, or occur more completely. In addition the ability to order the layers may enable reactions to occur in a specific order. Additionally, molecules or particles could be forced into orientations due to the shear stresses from the layering process which may promote reactions which may otherwise not occur.

Thus, while there have been shown, described and pointed out, fundamental novel features of the invention as applied to the exemplary embodiments thereof, it will be understood that various omissions and substitutions and changes in the form and details of devices and methods illustrated, and in their operation, may be made by those skilled in the art without departing from the spirit or scope of the invention. Moreover, it is expressly intended that all combinations of those elements and/or method steps, which perform substantially the same function in substantially the same way to achieve the same results, are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A pellet composition comprising:
   a. a solid object of 0.1 mm-1 cm on one axis by 0.1 mm-2 cm on a second axis;

b. ten to $10^6$ layers per millimeter along at least one axis;

c. wherein each layer is 0.1 nanometer to 9 millimeter in width;

d. wherein at least one layer comprising a composition comprising a hydrophobic agent, an acidic agent, a high concentration of an agent, or a high viscosity composition; and e. at least one other layer comprises a composition of a hydrophilic agent, basic agent, low concentration of an agent or a low viscosity composition.

2. A pellet composition according to claim 1 wherein the pellet is cylindrical, spherical, capsular, conical, conical frustum, cubular, hemispherical, pyramidal, rectangular prismatic or tubular.

3. A pellet composition according to claim 2 wherein at least one layer is 0.1-100 nanometer on one axis.

4. A pellet composition according to claim 2 wherein at least ten layers are 0.1-100 nanometer on one axis.

5. A pellet composition according to claim 3 wherein at least one hundred layers are 0.1-100 nanometer on one axis.

6. A pellet composition according to claim 3 wherein at least one thousand layers are 0.1-100 nanometer on one axis.

7. A pellet composition according to claim 3 wherein at least one layer is 0.01-1 micrometer on one axis.

8. A pellet composition according to claim 3 wherein at least one layer is 0.01-1 millimeter on one axis.

9. A pellet composition according to claim 3 wherein the melting point of the pellet is between about 0° C. to about 500° C.

10. A pellet composition according to claim 3 wherein the layers are twisted or turned geometries.

11. A pellet composition according to claim 3 wherein layers can take the form of flat layers, annular or tubular rings.

12. A pellet composition according to claim 3 comprising multiple components.

13. A pellet composition according to claim 3 comprising a core.

14. A pellet composition according to claim 3 wherein one or more layers additionally contain filler particles or fibers.

15. A pellet composition according to claim 3 wherein said fibers include yarns, a tow of fibers or yarns, a weave, a non-woven, chopped fiber, a chopped fiber mat (with random or ordered formats), or combinations of these formats.

16. A method of mixing one stream of material comprising a hydrophobic agent, an acidic agent, a high concentration of an agent, or a high viscosity composition; with a second stream of material comprising a hydrophilic agent, basic agent, low concentration of an agent or a low viscosity composition; by layering the streams into a single merged stream containing multiple layers wherein the thickness of the first stream layers is about the same as its largest component molecular or particle size and the thickness of the second stream layers is about the same as its largest component molecular or particle size.

17. A method according to claim 16, wherein a steam of material with a high concentration of an agent is diluted with a steam of material with a less concentrated material by layering the streams into a single merged stream containing multiple layers wherein the thickness of the layers is about the same as the components molecular or particle size.

* * * * *